ABSTRACT

United States Patent [19]

Yamahara et al.

[11] 3,897,507

[45] July 29, 1975

[54] METHOD FOR PRODUCING 3,4-DICHLOROBUTENE-1

[75] Inventors: Takeshi Yamahara, Kobe; Hiroshi Kishimoto, Takatsuki; Shinji Nakamura, Ibaraki; Takashi Deguchi, Takatsuki, all of Japan

[73] Assignee: Sumitomo Chemical Co., Ltd., Osaka, Japan

[22] Filed: Feb. 3, 1972

[21] Appl. No.: 223,298

Related U.S. Application Data

[63] Continuation of Ser. No. 762,950, Sept. 26, 1968, abandoned.

[30] Foreign Application Priority Data

Jan. 24, 1968 Japan.................................. 43-4493

[52] U.S. Cl............................................. 260/654 R
[51] Int. Cl.............................................. C07c 21/04
[58] Field of Search.................................. 260/654 R

[56] References Cited

UNITED STATES PATENTS

| 2,422,252 | 6/1947 | Otto............................... 260/654 R |
| 2,446,475 | 8/1948 | Hearne et al................... 260/654 R |

FOREIGN PATENTS OR APPLICATIONS

| 723,185 | 7/1965 | Canada........................... 260/654 R |

*Primary Examiner*—Delbert E. Gantz
*Assistant Examiner*—Joseph A. Boska
*Attorney, Agent, or Firm*—Sughrue, Rothwell, Mion, Zinn & Macpeak

[57] ABSTRACT 3,4-Dichlorobutene-1 is produced by heating 1,4-dichlorobutene-2 at 50°–160° C. in the presence of a copper-containing catalyst and a carboxylic acid amide such as formamide, dimethyl formamide, N-methyl pyrrolidone or N-methyl acetamide and separating 3,4-dichlorobutene-1 from the reaction mixture by distillation.

2 Claims, 1 Drawing Figure

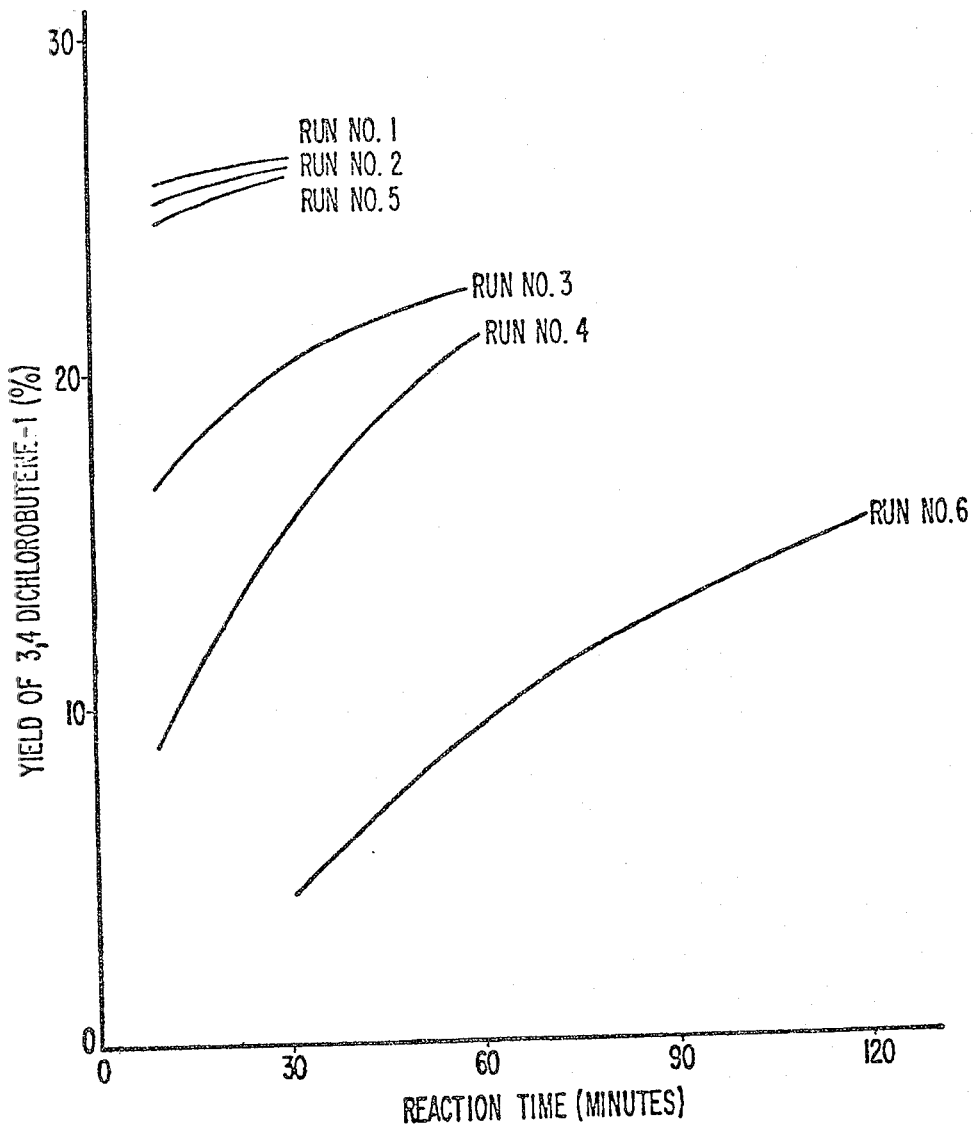

METHOD FOR PRODUCING 3,4-DICHLOROBUTENE-1

This is a continuation of application Ser. No. 762,950 filed Sept. 26, 1968, now abandoned.

BACKGROUND OF THE INVENTION

1. Field of the Invention

The present invention relates to a method for producing 3,4-dichlorobutene-1 by isomerization of 1,4-dichlorobutene-2. More particularly, it pertains to a method for producing 3,4-dichlorobutene-1 by isomerization of 1,4-dichlorobutene-2 with heat in the presence of a catalyst.

2. Description of the Prior Art

It is well known that chloroprene usually in the form of chloroprene rubber is produced by reacting 3,4-dichlorobutene-1 with an alakali metal hydroxide.

It is further well known that 3,4-dichlorobutene-1 can be produced by isomerization of 1,4-dichlorobutene-2 with heating in the presence of a copper-containing catalyst. However in these conventional processes, the rate of isomerization is relatively low, and many undesirable side reactions such as the formation of 1-chlorobutadiene or polymerization of dichlorobutenes has been found to occur together with the desired isomerization, thereby reducing the yield of 3,4-dichlorobutene-1. Generally, in order to suppress these undesirable side reactions, it was preferable to carry out the isomerization at as low a temperature as possible. However, at temperatures of lower than 110°C., which is necessary to effectively suppress these undesirable side reactions, the rate of isomerization becomes so low that the reaction is no longer practical.

SUMMARY OF THE INVENTION

As a result of repeated studies, the present inventors have now found that when a carboxylic acid amide is present in the isomerization reaction mixture while heating in the presence of a copper-containing catalyst, the carboxylic acid amide has the surprising effect of not only suppressing undesired side reactions, but also of promoting the activity of the copper-containing catalyst thereby increasing the rate of isomerization, as compared with the same reaction in the absence of the carboxylic acid amide, and 3,4-dichlorobutene-1 is obtained in a significantly higher yield.

The present inventors have further found that a carboxylic acid amide is effective in suppressing the influence of ferric chloride in the reaction mixture during isomerization. Ferric chloride is likely to be present in the reaction mixture due to corrosion of the apparatus. When ferric chloride is present in the reaction mixture in the absence of a carboxylic acid amide, it tends to promote undesirable side reactions such as polymerization of dichlorobutenes which results in a reduction in the yield of the desired product, 3,4-dichlorobutene-1.

One object of the present invention is therefore to provide an improved process for producing 3,4-dichlorobutene-1 whereby 1,4-dichlorobutene-2 is isomerized in the presence of a copper-containing catalyst.

Other objects will be apparent from the following descriptions.

In order to accomplish these objects, the isomerization of 1,4-dichlorobutene-2 to 3,4-dichlorobutene-1 is accomplished in the presence of a copper-containing catalyst.

BRIEF DESCRIPTION OF THE DRAWING

FIG. 1 is a graph of the % yield of the reaction of this invention as a function of reaction time.

According to the present invention, 1,4-dichlorobutene-2, a copper-containing catalyst and a carboxylic acid amide are placed in a reaction apparatus, and the resultant mixture is heated at 50°–160°C, whereby the isomerization proceeds and 3,4-dichlorobutene-1 is produced. It is preferable to separate 3,4-dichlorobutene-1 from the reaction mixture by distillation during the isomerization and at the same time to continuously or intermittently supply 1,4-dichlorobutene-2 into the reaction mixture so as to maintain a uniform reaction mixture.

Since carboxylic acid amide is often distilled from the reaction mixture with the 3,4-dichlorobutene-1, it is often necessary to add additional amounts of the carboxylic acid amide during the reaction.

In the present invention, such catalysts as halogenated copper, such as copper chloride or copper bromide, copper carbonate, copper thiocyanate, copper nitrate, copper acetate, copper naphthenate, copper oxide and copper metal are useable. In the present invention, the quantity of copper-containing catalyst required is less than convention isomerization reactions, since the activity of the copper-containing catalyst is remarkably increased by the presence of the carboxylic acid amide. Generally, the copper-containing catalyst is used in an amount of 0.001–5% by weight based on the weight of the 1,4-dichlorobutene-2.

Examples of the carboxylic amide used in the present invention include the aliphatic carboxylic acid amines, such as formamide, acetamide, propionamide or butyramide, and the aromatic carboxylic acid amides, such as benzamide or phthalimide, as well as the lactams, such α-pyrrolidone, α-piperidone or ε-caprolactam. Moreover, N-alkylated compounds, N-aralkylated compounds, N-arylated compounds and N-acylated compounds of the above carboxylic acid amides, such as N,N-dimethyl formamide, N-methyl acetamide, N-methyl α-pyrrolidone, N,N-diphenyl formamide or phthalimide are also usable.

The greater the amount of the carboxylic acid amide in the reaction mixture, the smaller the amount of by-products produced. Generally, the carboxylic acid amide is used in an amount of 0.1–20%, and preferably 0.5–10% by weight based on the weight of 1,4-dichlorobutene-2. Carboxylic acid amides are not always effective in larger amounts than the herein recited range.

In the present invention the isomerization is carried out at a temperature of 50°–160°C. and preferably from 90° to 120°C. The pressure may be maintained either at normal or reduced pressures.

As should be clear from the aforesaid description, the isomerization of the present invention has the following advantages.

1. In the process of the isomerization of the present invention, the rate of isomerization is higher than the rate where a copper-containing catalyst is used alone.

2. In the isomerization of the present invention, undesirable side reactions are suppressed in comparison with those being produced when a copper-containing catalyst is used alone.

3. In the isomerization of the present invention, it is possible to suppress the undesirable influence of ferric chloride in the isomerization reaction.

4. Therefore, in the isomerization of the present invention, 3,4-dichlorobutene-1 is produced in a significantly higher yield and in a purer state at a lower isomerization temperature using a smaller amount of a copper-containing catalyst than in the conventional isomerization.

The present invention will now be illustrated in greater detail by reference to the following examples. It should be understood, however, that the invention is not intended to be limited by these examples. All parts are based on weight.

EXAMPLE 1

Into a reaction apparatus fitted with a rectification tower and a feeder of 1,4-dichlorobutene-2 was placed 100 parts of 1,4-dichlorobutene-2, 0.25 parts of cuprous chloride and 1 part of dimethyl formamide. The resultant mixture was heated while under a pressure of 200 mm Hg. The thus formed 3,4-dichlorobutene-1 was distilled from the top of the rectification tower and was collected. 1,4-dichlorobutene-2 was supplied from the feeder so that the reaction liquid in the reaction apparatus was maintained uniform. The above-mentioned procedure was conducted continuously for 20 hours. A comparative experiment was conducted without addition of dimethyl formamide. The results as shown in the following Table 1 were obtained.

TABLE 1

|  | Result of Reaction with addition of dimethyl formamide | Result of Reaction without addition of dimethyl formamide |
|---|---|---|
| Temperature of reaction mixture (°C.) | 111 | 112–113 |
| Amount of distillate parts/hour | 128 | 10 |
| Component of distillate |  |  |
| 3,4-Dichlorobutene-1 (%) | 99.0 | 93.7 |
| 1,4-Dichlorobutene-2 (%) | 0.9 | 2.8 |
| 1-Chlorobutadiene (%) | 0.1 | 3.5 |

EXAMPLE 2

Into a reaction apparatus similar to that used in Example 1 was placed 100 parts of 1,4-dichlorobutene-2 and 0.1 parts of cupric chloride and 1 part of N-methyl α-pyrrolidone, and the mixture subjected to a procedure similar to that conducted in Example 1 for 9 hours at normal pressure. The results shown in Table 2 were obtained.

TABLE 2

| Temperature of Reaction Mixture (°C) | 155 |
|---|---|
| Amount of Distillate (parts/hour) | 90 |
| Composition of Distillate (%) |  |
| 3,4-Dichlorobutene-1 | 98.4 |
| 1,4-Dichlorobutene-2 | 0.6 |
| 1-Chlorobutadiene | 1.0 |

EXAMPLE 3

Into a reaction apparatus fitted with a reflux condenser was placed 100 parts of 1,4-dichlorobutene-2, a fixed amount of a copper-containing catalyst and a carboxylic acid amide as listed in the Table 3, respectively, and the resultant mixture was heated to 120°C. The amount of 3,4-dichlorobutene-1 produced was measured by quantitative analysis of the reaction mixture with a gas chromatograph as a function of time. The results shown in FIG. 1 were obtained.

TABLE 3

| Run No. | Copper-Containing Catalyst (Part) | Carboxylic Acid Amide (Part) |
|---|---|---|
| 1 | Cuprous chloride (0.5) | α-pyrrolidone (3) |
| 2 | Cuprous chloride (0.5) | N-Methyl acetamide (3) |
| 3 | Cupric chloride (0.5) | Formamide (3) |
| 4 | Cupric chloride (0.5) | Phthalimide (3) |
| 5 | Copper naphthenate (3.0) | Dimethyl formamide (3) |
| 6 | Cuprous chloride (0.5) | — |

EXAMPLE 4

Into a reaction apparatus similar to that used in Example 3 was placed 100 parts of 1,4-dichlorobutene-2, 1 part of cuprous chloride and N-methyl acetamide in an amount as shown in the Table 4. The resultant mixture was heated at 100°C., and the amount of 3,4-dichlorobutene-1 formed and the rate of formation of 1-chlorobutadiene were measured as a function of time. A result shown by the Table 4 was obtained.

TABLE 4

| Run No. | Amount of N-methyl acetamide (parts) | Reaction Time (minutes) | 3,4-Dichloro-butene-1 (parts) | 1-Chloro-butadiene (parts/hour) |
|---|---|---|---|---|
| 1 | 0 | 120 | 1.0 | — |
| 2 | 0.7 | 30 | 8.5 | 0.1 |
| 3 | 7.4 | 30 | 19.2 | 0.04 |

What is claimed is:

1. In a process for isomerizing 1,4-dichlorobutene-2 to produce 3,4-dichlorobutene-1 in the presence of a copper-containing catalyst selected from the group consisting of copper chloride, copper bromide, copper carbonate, copper thiocyanate, copper nitrate, copper actate, copper naphthenate, copper oxide and copper metal, the improvement which comprises carrying out the isomerization by heating at a temperature ranging from 90°–120°C., a mixture of said 1,4-dichlorobutene-2 and said copper-containing catalyst with a carboxylic acid amide selected from the group consisting of formamide, dimethylformamide, N-methyl-α-pyrrolidone, α-pyrrolidone, N-methyl acetamide and phthalimide, said carboxylic acid amide being present in an amount sufficient to promote the activity of the copper-containing catalyst, thus increasing the rate of isomerization, whereby the 3,4-dichlorobutene-1 is separated from the reaction mixture through distillation during the isomerization reaction and at the same time, 1,4-dichlorobutene-2 is supplied into the reaction mixture so as to keep the composition of the reaction mixture uniform, said carboxylic acid amide being present in an amount ranging from 0.5–10.0 percent by weight, based on the weight of the 1,4-dichlorobutene-2.

2. The process of claim 1, wherein said copper-containing catalyst is present in an amount ranging from 0.001 to 5.0 percent by weight based on the weight of 1,4-dichlorobutene-2.

* * * * *